April 20, 1965 J. C. LUCHT 3,179,301

SQUEEZE-TYPE DISPENSING HEAD

Original Filed Oct. 17, 1960 12 Sheets-Sheet 1

INVENTOR
JOHN C. LUCHT

BY Wright and Wright

ATTORNEYS

INVENTOR
JOHN C. LUCHT

BY *Wright and Wright*

ATTORNEYS

April 20, 1965 J. C. LUCHT 3,179,301

SQUEEZE-TYPE DISPENSING HEAD

Original Filed Oct. 17, 1960 12 Sheets-Sheet 3

INVENTOR
JOHN C. LUCHT

BY

Wright and Wright

ATTORNEYS

April 20, 1965 J. C. LUCHT 3,179,301

SQUEEZE-TYPE DISPENSING HEAD

Original Filed Oct. 17, 1960 12 Sheets-Sheet 4

INVENTOR.
JOHN C. LUCHT

BY John Q Diehl

ATTORNEY

April 20, 1965 J. C. LUCHT 3,179,301

SQUEEZE-TYPE DISPENSING HEAD

Original Filed Oct. 17, 1960

12 Sheets-Sheet 5

INVENTOR.
JOHN C LUCHT

BY John L. Diehl

ATTORNEY

SQUEEZE-TYPE DISPENSING HEAD

Original Filed Oct. 17, 1960 12 Sheets-Sheet 6

INVENTOR.
JOHN C. LUCHT
BY
ATTORNEY

INVENTOR.
JOHN C. LUCHT
BY [signature]
ATTORNEY

SQUEEZE-TYPE DISPENSING HEAD

Original Filed Oct. 17, 1960

*INVENTOR.*
JOHN C LUCHT

BY [signature]

ATTORNEY

INVENTOR.
JOHN C. LUCHT
BY
ATTORNEY

April 20, 1965 J. C. LUCHT 3,179,301

SQUEEZE-TYPE DISPENSING HEAD

Original Filed Oct. 17, 1960 12 Sheets-Sheet 10

INVENTOR.
JOHN C. LUCHT

BY

ATTORNEY

April 20, 1965 J. C. LUCHT 3,179,301

SQUEEZE-TYPE DISPENSING HEAD

Original Filed Oct. 17, 1960 12 Sheets-Sheet 11

INVENTOR.
JOHN C. LUCHT

BY John L. Viehl

ATTORNEY

INVENTOR.
JOHN C. LUCHT

BY [signature]

ATTORNEY

United States Patent Office 3,179,301
Patented Apr. 20, 1965

3,179,301
SQUEEZE-TYPE DISPENSING HEAD

John Charles Lucht, New York, N.Y., assignor to The Battelle Development Corporation, Columbus, Ohio, a corporation of Delaware Continuation of application Ser. No. 62,948, Oct. 17, 1960. This application Feb. 17, 1964, Ser. No. 346,375
15 Claims. (Cl. 222—213)

This invention relates to a dispensing head and more particularly to a novel self-closing dispensing head for tubes and resilient containers. This dispensing head has particular adaptability for use both with pasty and semi-fluid types of matter such as tooth-paste, shaving cream, catsup, mustard and the like and with relative fluid materials such as water and aqueous solutions.

This application is a continuation of my co-pending application Serial No. 62,948 filed October 17, 1960, now abandoned which is a continuation-in-part of application Serial No. 795,971 filed February 27, 1959, now abandoned.

There has long been a need for a dispenser in which the dispensing opening therein is self-closing, thus eliminating the use of screw tops now predominantly in use for such purposes. In the past, efforts have been made to overcome this difficulty and various types of closing members have been provided for deformable tubes and squeeze type containers which include hinged devices, slide closures and even resilient self-closures. However, while some of these devices have overcome the difficulty and necessity of utilizing a removable cap for the closure, most of these closures were still difficult to use or too expensive to manufacture and thus prevented their widespread use. In order to provide a self-closing dispensing head, particularly for toothpaste and the like, it is necessary that the closure be held firm and tight in its closed position and in particular to squeeze the remaining paste entirely free of the mating closure members. This tight closure is necessary because toothpaste in particular, and also foodstuffs, tend to harden or disintegrate upon contact with the atmosphere.

It is therefore a primary object of my present invention to provide a dispenser of the squeeze type with a novel self-closing dispensing head which in its closed position will be held firmly in place and will not allow air to enter the interior of the dispenser.

Another object is to provide a self-closing dispensing head comprising a resilient material wherein opposite sidewalls of the dispensing head are relatively rigid and are rotatable or hingeable with respect to each other about a fulcrum to provide an opening through which material is dispensed from the head, the fulcrum being coincident with the termini of said opening to provide a dispensing opening which is readily closed and tightly sealed.

A further object is to provide a self-closing dispensing head comprising resilient material wherein stresses within the head cause a dispensing opening in the head to be tightly sealed to prevent ingress of air or egress of material from said head when the pressure of the operator's fingers on the head is released.

Another object of my invention is to provide a simple, practical and reliable construction that is economical to manufacture and positive in its operation.

With the above and other objects in view, which will more readily appear as the nature of the invention is better understood, the same consists in the novel construction and arrangement hereinafter more fully described, illustrated and claimed.

In the drawings, like reference numerals refer to like parts and:

Figure 1:
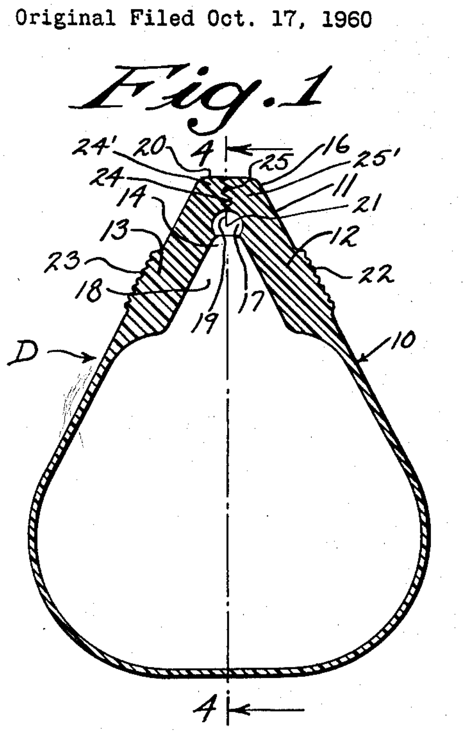
FIGURE 1 is a side elevational view in section showing one form of the dispensing head of my invention in its closed position, combined with a container.
Figure 2:
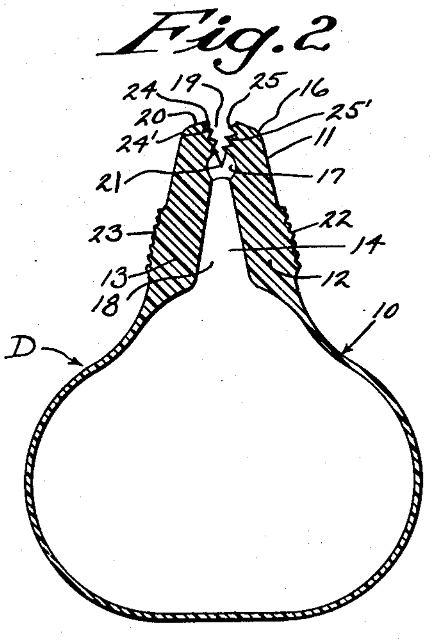
FIGURE 2 is a side elevational view in section similar to that of FIGURE 1 but showing the head in open position.
Figures 13, 14, 15:
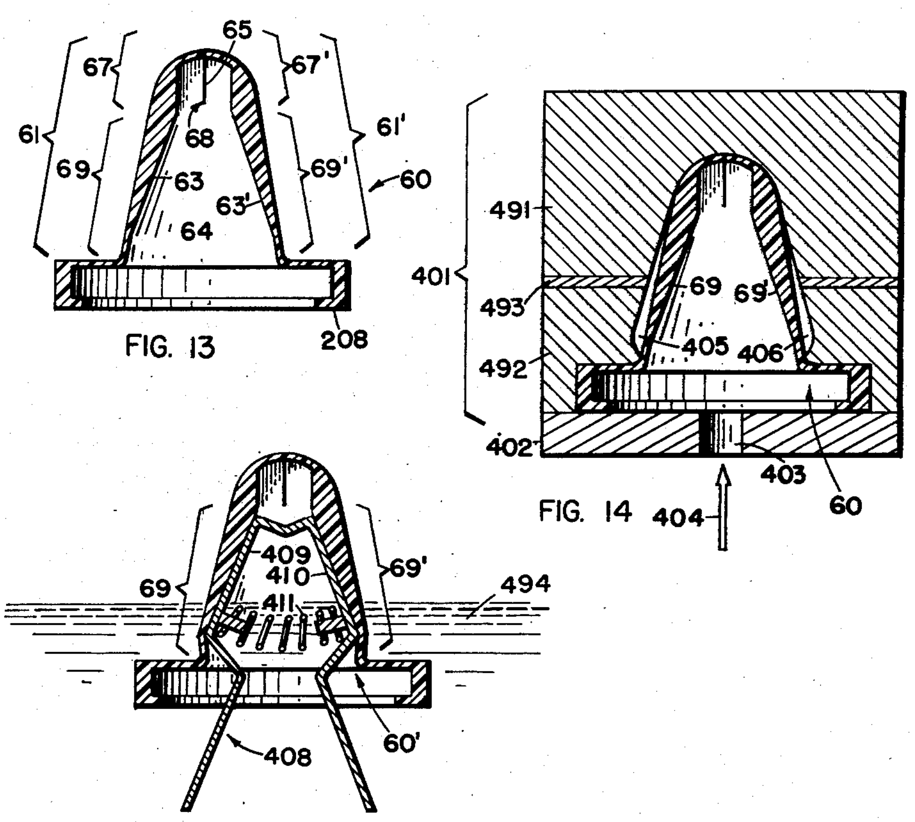
FIGURE 13 is a cross-sectional view of a head from which another embodiment may be made.
Figure 22:
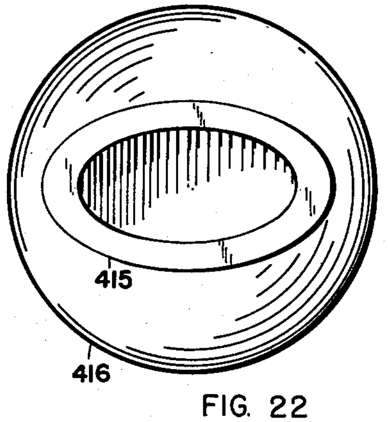
Figure 23:
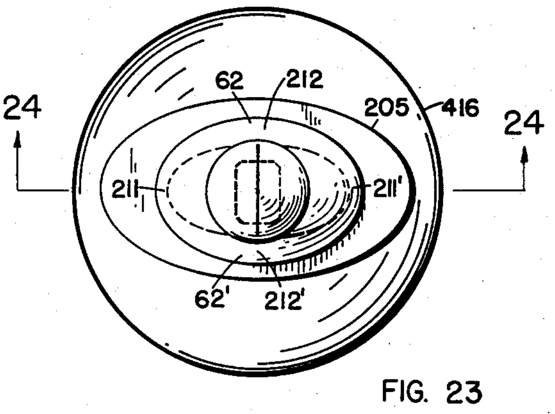
Figure 24:
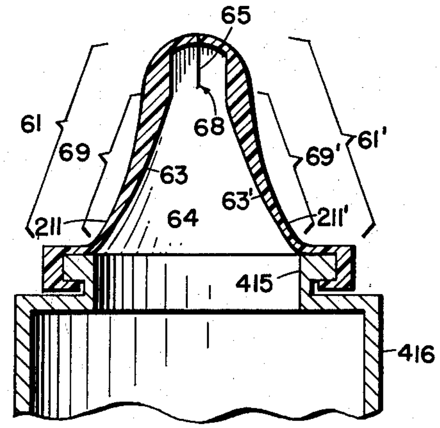
Figure 13A:
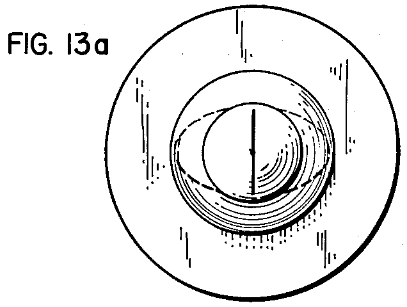
Figure 26:
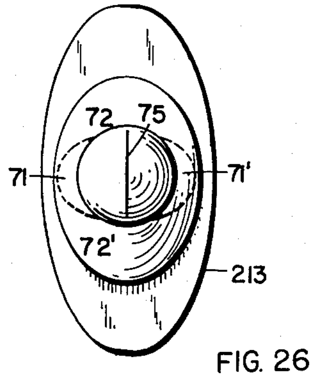
Figures 25, 27:
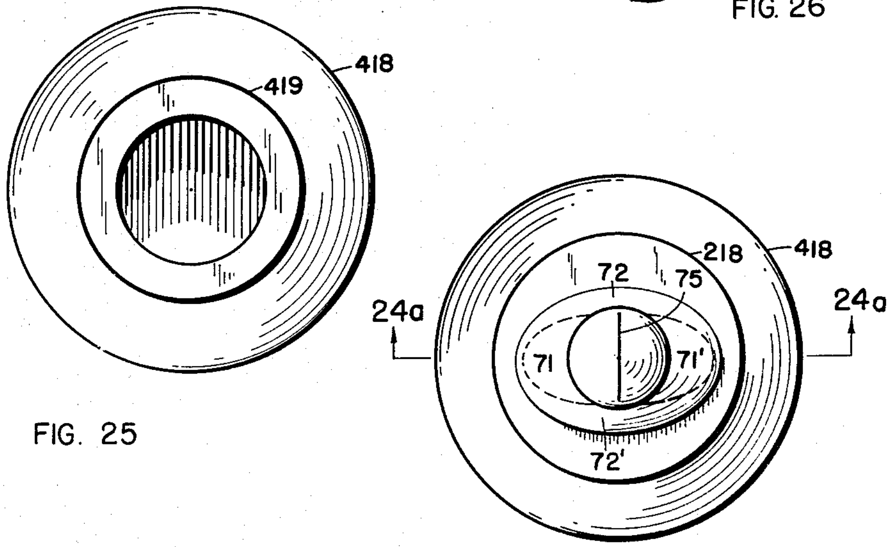
Figure 16:
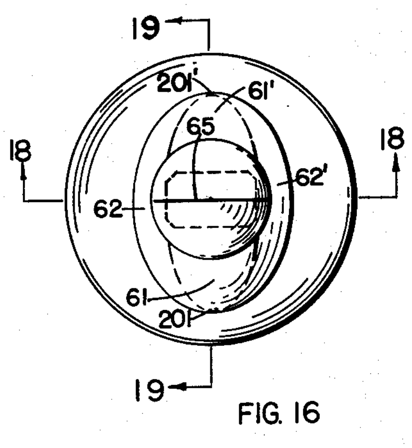
Figure 17:
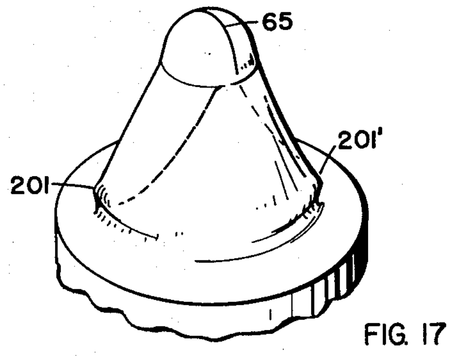
Figure 18:
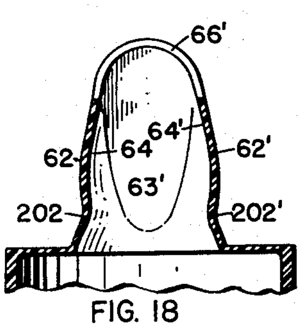
Figure 19:
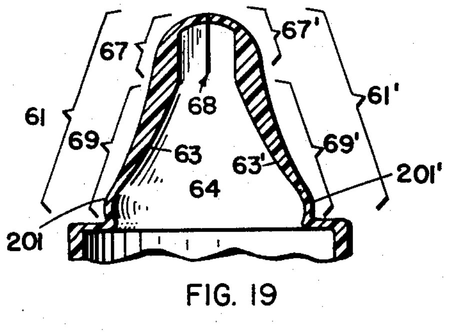
Figure 20:
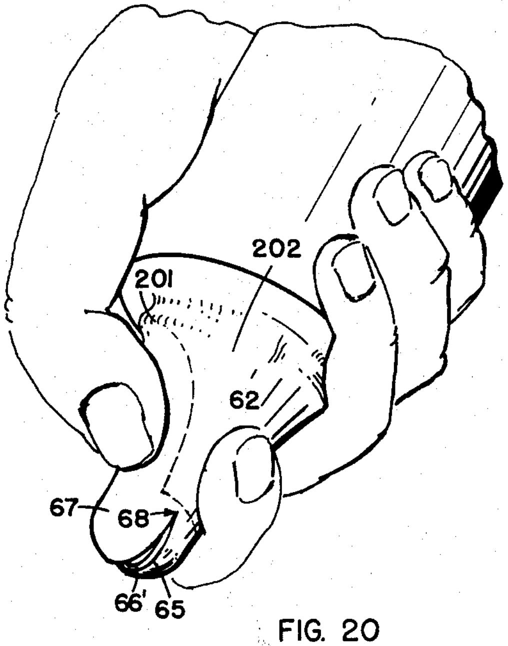
Figure 21:
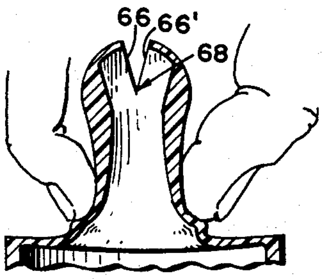
Figure 28:
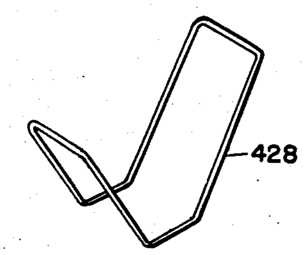
Figure 29:
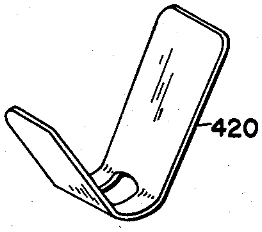
Figure 30:
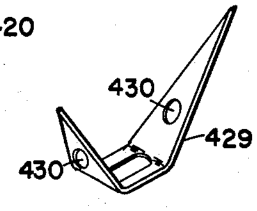
Figure 31:
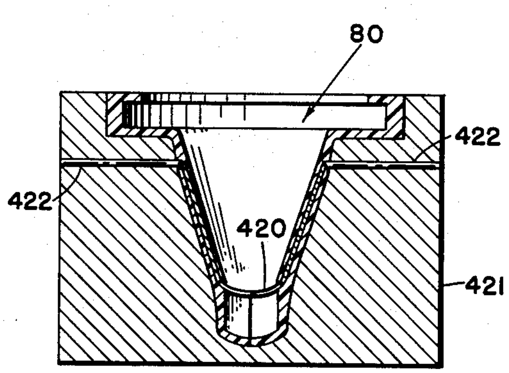
Figure 32:
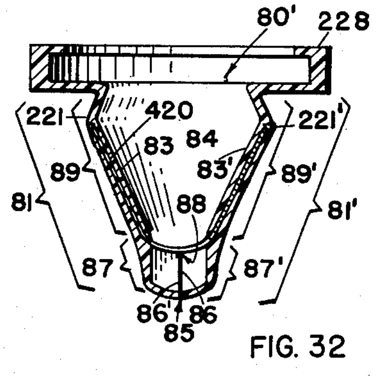
Figure 33:
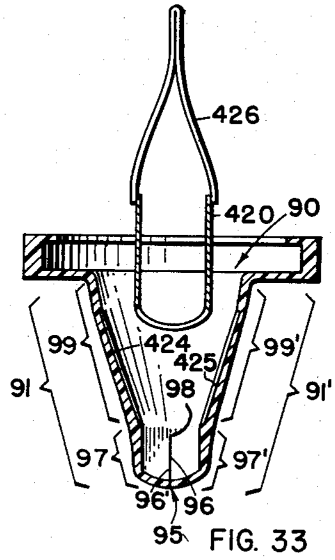
Figure 34:
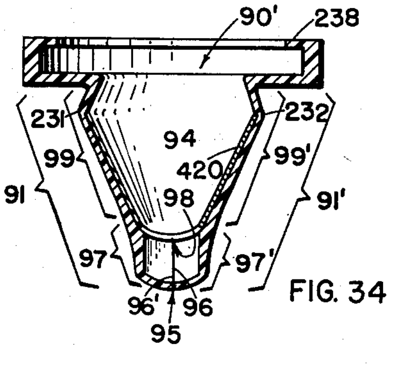
Figure 35:
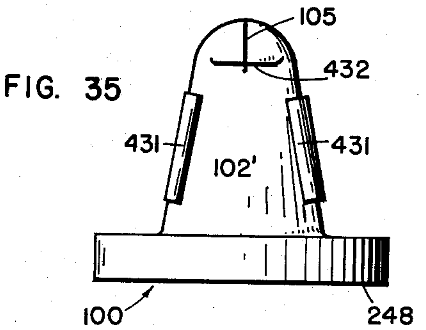
Figure 38:
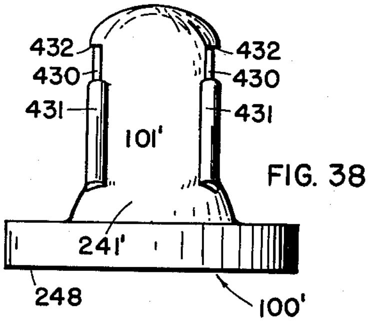
Figure 36:
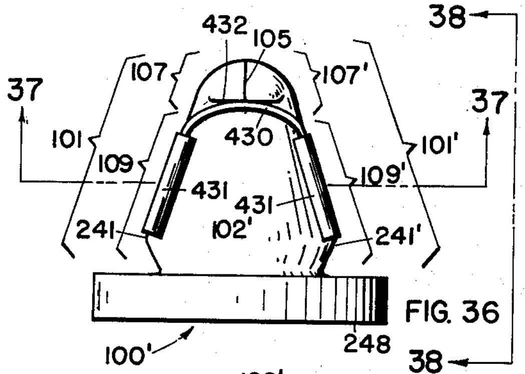
Figure 41:
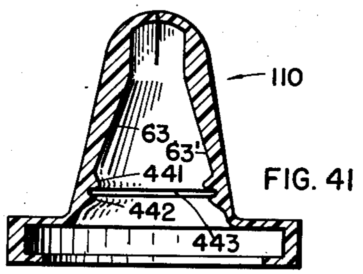
Figure 37:
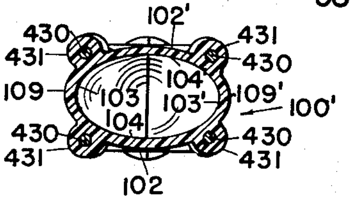
Figure 42:
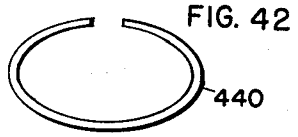
Figure 43:
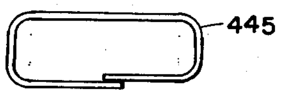
Figure 44:
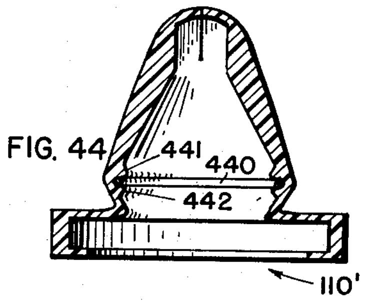
Figure 39:
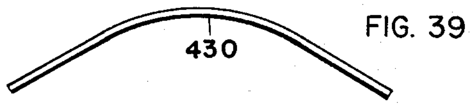
Figure 40:
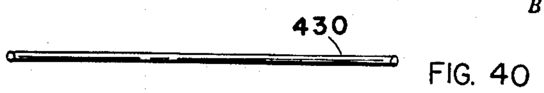
Figure 45:
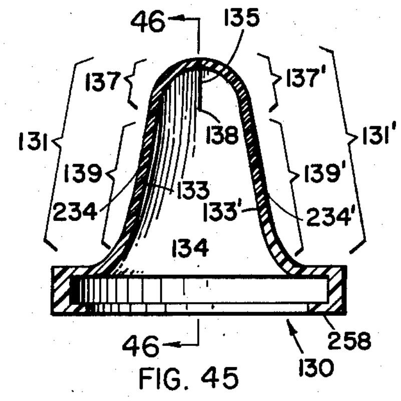
Figure 46:
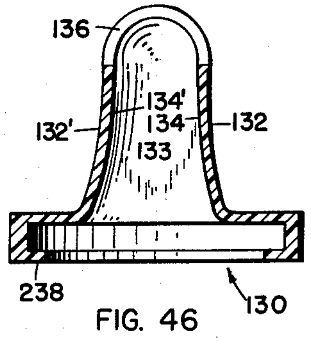
Figure 47:
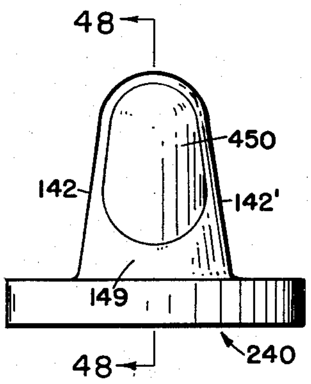
Figure 48:
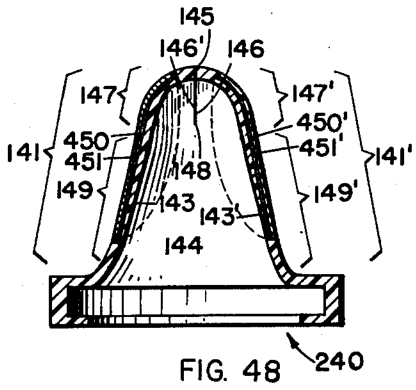
Figure 49:
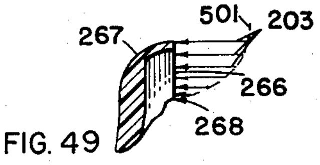
Figure 50:
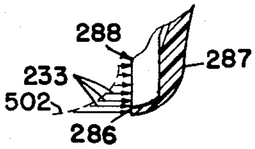
Figure 51:
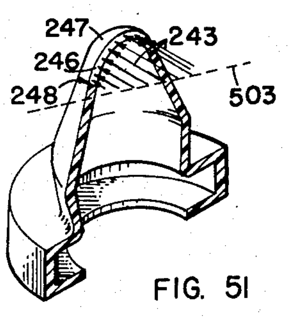
Figure 52:
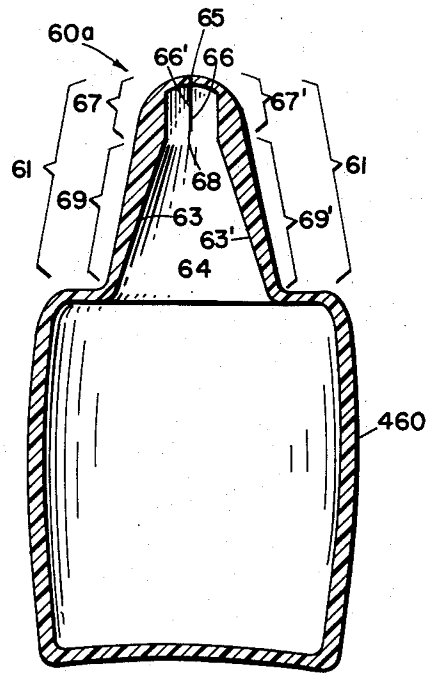
Figure 53:
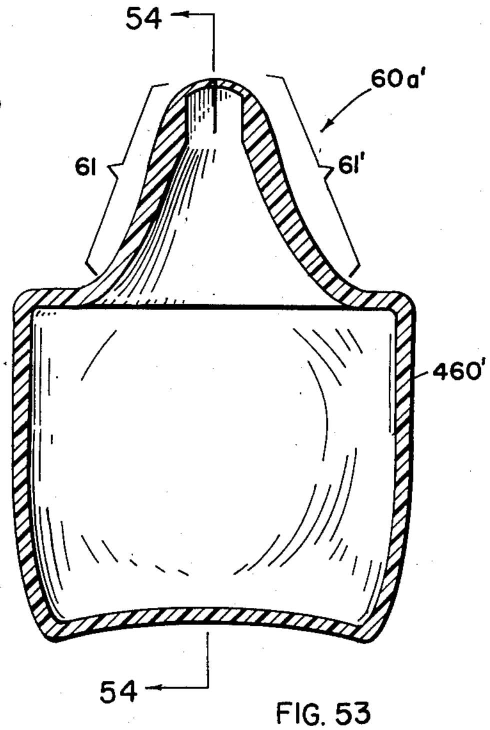
Figure 54:
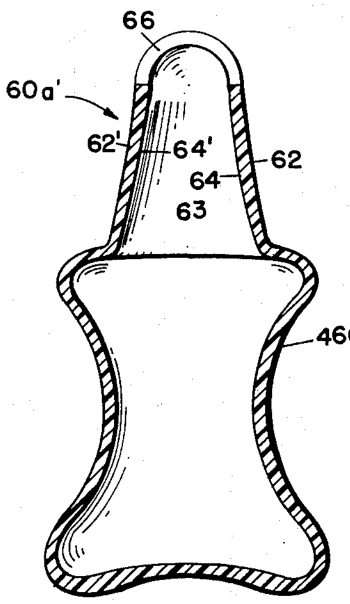
Figures 55, 56:
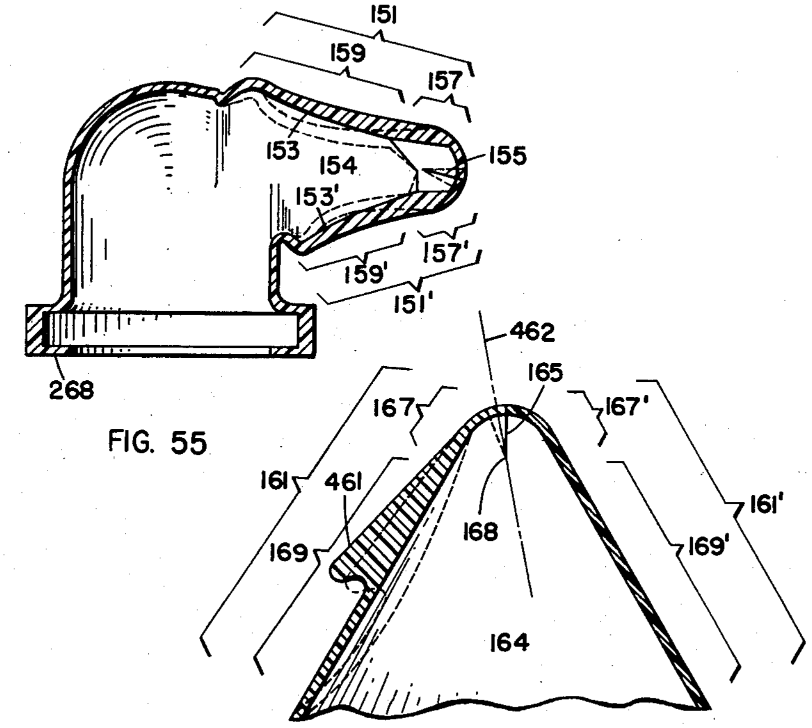
Figure 57:
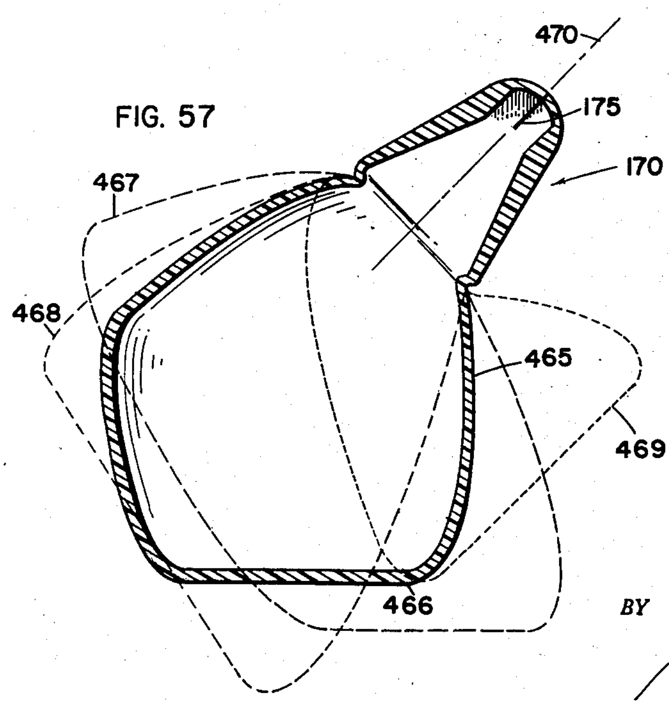
Figure 58:
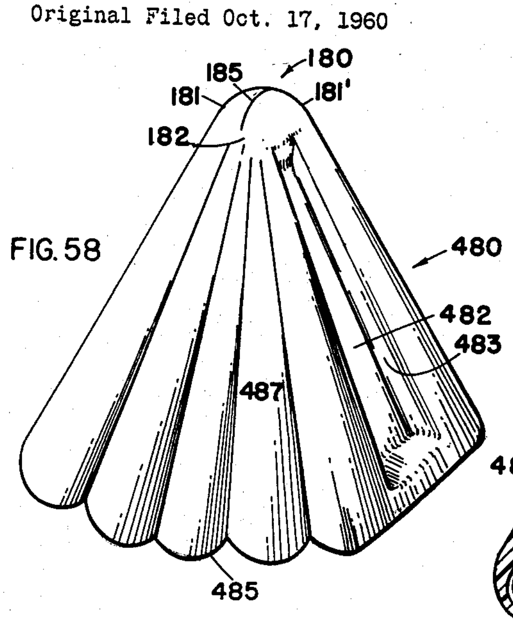
Figure 59:
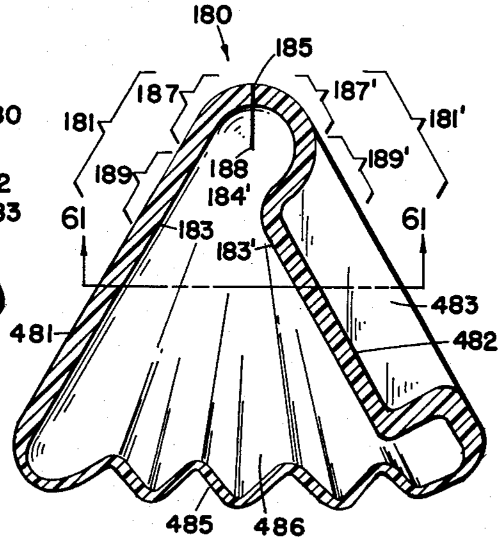
Figure 60:
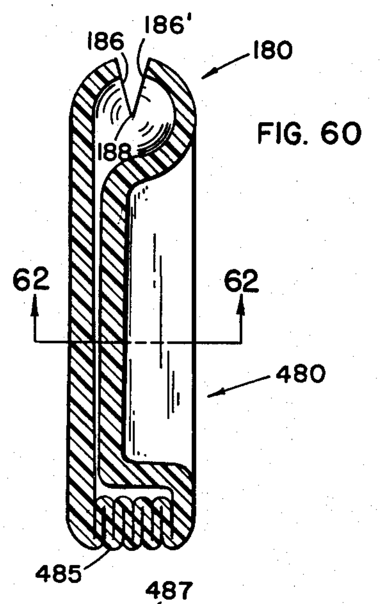
Figure 61:
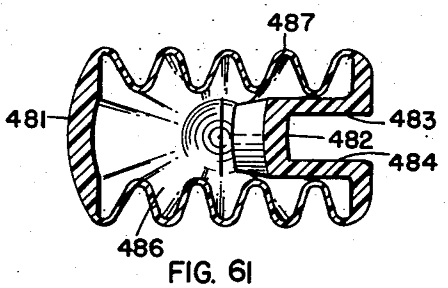
Figure 62:
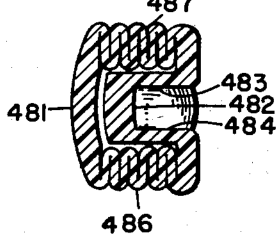

FIGURE 13*a* is a plan view of the head of FIGURE 13;

FIGURE 14 is a schematic cross-sectional view of a step in a process of making the embodiment of FIGURES 16 to 21 from the head of FIGURE 13;

FIGURE 15 is a schematic cross-sectional view of a step in another process of making the embodiment of FIGURES 16 to 21 from the head of FIGURE 13;

FIGURE 16 is a plan view of another embodiment of a dispensing head in accordance with the invention;

FIGURE 17 is a perspective view of the embodiment of FIGURE 16;

FIGURE 18 is a cross-sectional view of the embodiment of FIGURE 16 taken on line 18—18 in FIGURE 16;

FIGURE 19 is a cross-sectional view of the embodiment of FIGURE 16 taken on line 19—19 in FIGURE 16;

FIGURE 20 is a perspective view of the embodiment of FIGURES 16 to 19 in operational use;

FIGURE 21 is a cross-sectional view of the embodiment of FIGURE 16 taken substantially from the viewpoint of line 19—19 in FIGURE 16 and showing the dispensing head in use in a manner similar to that of FIGURE 20;

FIGURE 22 is a top view of a substantially cylindrical bottle having an elliptical neck and an elliptical opening in the top;

FIGURE 23 is a top view of an embodiment provided by applying the head of FIGURE 13 to the bottle of FIGURE 22;

FIGURE 24 is a cross-sectional view of the embodiment of FIGURE 23 taken on line 24—24 in FIGURE 23;

FIGURE 25 is a plan view of a cylindrical bottle having a substantially circular neck and a substantially circular top opening in the bottle;

FIGURE 26 is a top view of a head from which another embodiment of the invention may be provided;

FIGURE 27 is a top view of another embodiment of the head of the invention provided by applying the head of FIGURE 26 to the bottle of FIGURE 25;

FIGURE 28 is a perspective view of a spring member which may be applied to provide a dispensing head in accordance with the invention;

FIGURE 29 is a perspective view of another spring which may be applied to provide a dispensing head in accordance with the invention;

FIGURE 30 is a perspective view of another spring which may be applied to provide a dispensing head in accordance with the invention;

FIGURE 31 is a cross-sectional schematic view of one step in the preparation of the embodiment of FIGURE 32;

FIGURE 32 is a cross-sectional view of another embodiment in accordance with the invention;

FIGURE 33 is a schematic, cross-sectional view of a step in the preparation of the embodiment of FIGURE 34;

FIGURE 34 is a cross-sectional view of another embodiment in accordance with the invention;

FIGURE 35 is an elevation of a head which may provide an embodiment in accordance with the invention;

FIGURE 36 is a side view corresponding to that of FIGURE 35 of an embodiment provided by suitably applying to the device of FIGURE 35 a spring in accordance with FIGURES 39 and 40;

FIGURE 37 is a cross-sectional view taken on line 37—37 in FIGURE 36;

FIGURE 38 is an elevation taken from the viewpoint of line 38—38 of the head of the embodiment of FIGURE 36;

FIGURE 39 is an elevation of a spring member;

FIGURE 40 is a top view of the spring member of FIGURE 39;

FIGURE 41 is a cross-sectional view of another head from which an embodiment in accordance with the invention may be made;

FIGURE 42 is a perspective view of a spring;

FIGURE 43 is a perspective view of another spring;

FIGURE 44 is a cross-sectional view of a dispensing head in accordance with the invention made by applying the spring of FIGURE 42 to the head of FIGURE 41;

FIGURE 45 is a cross-sectional view of another embodiment in accordance with the invention;

FIGURE 46 is a cross-sectional view of the embodiment of 45 taken from the viewpoint of line 46—46 in FIGURE 45;

FIGURE 47 is a side elevation of another embodiment;

FIGURE 48 is a cross-sectional view of the embodiment of FIGURE 47 taken on line 48—48 in FIGURE 47;

FIGURE 49 is a fragmentary schematic cross-sectional view of a portion of an embodiment;

FIGURE 50 is a fragmentary schematic cross-sectional view of a portion of an embodiment;

FIGURE 51 is a cutaway perspective schematic view of a portion of an embodiment;

FIGURE 52 is a cross-sectional view of dispensing head and container integral therewith from which another embodiment may be made;

FIGURE 53 is a cross-sectional view of an embodiment made from the device of FIGURE 2;

FIGURE 54 is a cross-sectional view of the embodiment of FIGURE 53 taken from the viewpoint of line 54—54 in FIGURE 53;

FIGURE 55 is a cross-sectional view of another embodiment;

FIGURE 56 is a cross-sectional view of another embodiment;

FIGURE 57 is a cross-sectional schematic view of still further embodiments;

FIGURE 58 is a perspective view of another embodiment of a dispensing head in accordance with the invention combined with a container;

FIGURE 59 is a cross-sectional view of the embodiment of FIGURE 58 in a closed position as shown in FIGURE 58;

FIGURE 60 is a cross-sectional view corresponding to that of FIGURE 59 of the embodiment of FIGURE 58 with the opening of the dispensing head in the open position;

FIGURE 61 is a cross-sectional view taken from the viewpoint of line 61—61 in FIGURE 59;

FIGURE 62 is a cross-sectional view taken from the viewpoint of line 62—62 in FIGURE 60.

Referring now to the drawings in detail, wherein similar reference characters designate corresponding parts throughout the several views, the letter "D" generally indicates my novel dispenser and the same broadly includes the dispenser body 10 and my new and improved self-closing dispenser head 11. Obviously the body 10 may be made in any desired shape and from any type of flexible, resilient or collapsible material. However, the self-closing dispensing head 11 should be formed from a resilient material which, when deformed, will tend to assume its original position upon release of pressure.

The portion 17 of the interior may be made any desired shape. The thickened walls 12 and 13 angle away from the central opening or conduit 17, as shown, and provide access to the interior of the body 10, as indicated by the numeral 18. I also provide a transverse slit 19 across the entire upper surface 20 of the dispensing head 11 and which terminates midway of the conduit 17, as indicated by the numeral 21. Obviously, therefore, when pressure is put on the finger members 22 and 23, the slit 19 is opened and the interior contents of the body may be dispensed. I may also provide a number of semi-circular serrations or tongue and groove members 24 and 25 on each jaw 24' and 25' respectively, and it is noted that these extend entirely around the opening or central cavity 17 and meet at the fulcrum points 21, so that when the dispenser is in its closed position, the aperture will be entirely sealed from the atmosphere and thus the contents protected.

Figure 10:
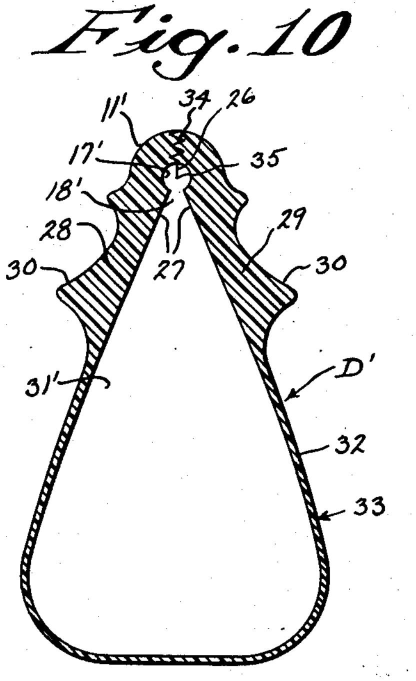
FIGURE 10 is a side-elevational view in section of a modification of the embodiment of FIGURE 1.
Figure 11:
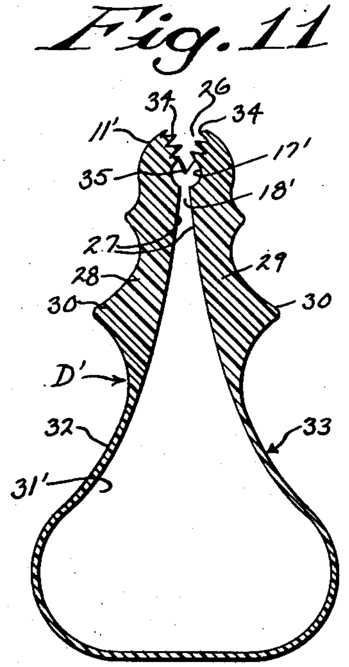
FIGURE 11 is a view corresponding to FIGURE 10 and showing the dispensing head in the open position.
Figure 12:
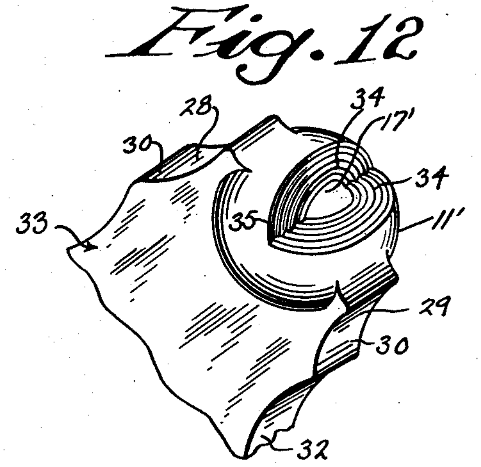
FIGURE 12 is a fragmentary perspective view from above of the embodiment of FIGURE 11 in the position shown in FIGURE 11.

I thus provide a dispensing head of resilient material, having a central cavity and a slit extending into said cavity providing a fulcrum defined by fulcrum points 35 at the ends of the slit, that is one fulcrum point at each end, and in this regard attention is directed to FIGURES 10 to 12, inclusive, wherein the basis principle and structure of my invention can be better explained and understood. In this form, the dispensing head 11' may be formed with generally convex outer surfaces and may be hollowed out to provide the upper portions 17' and 18' of chamber 31' having walls 27. Slit 26 is provided at one end, extending into the cavity or portion 17' to point 35. Walls 28 and 29 are relatively thick and are provided with thumb or finger grips 30. Inward pressure on the grips 30 opens the slit 26 by causing the jaws to pivot about the fulcrum 35 thus providing access to the interior of chamber 31'. This chamber is formed by the continuous walls 32 of the body 33. I may also provide each wall or jaw member of the slit 26 with circular serrations which interlock, as indicated by the number 34. When inward pressure is released the natural resiliency of the material will tend to close the slit or opening about the fulcrum points thus effectively sealing the contents from the atmosphere.

It should be here noted that the opening or slit 26 (FIGURES 10 and 12) and the opening or slit 19 (FIGURES 1 to 4) as well as the slit in the remaining figures yet to be described may be sealed with a coating or membrane at the factory in order to protect the contents from contamination, evaporation or the like.

If desired, the effect could be achieved by molding the closure with the slit not quite through to the exterior, but easily ruptured by the ultimate consumer's first digital manipulation. Further, the closure may be secured during packing, distribution, storage, etc. by an elastic band around the jaws of the opening or by any other desired means.

I also wish to point out that my novel dispenser may be made in any desired shape or superficial design and that I have only shown and described a few preferred forms in order to better illustrate the versatility of my basic concept.

Figures 3, 4, 5:
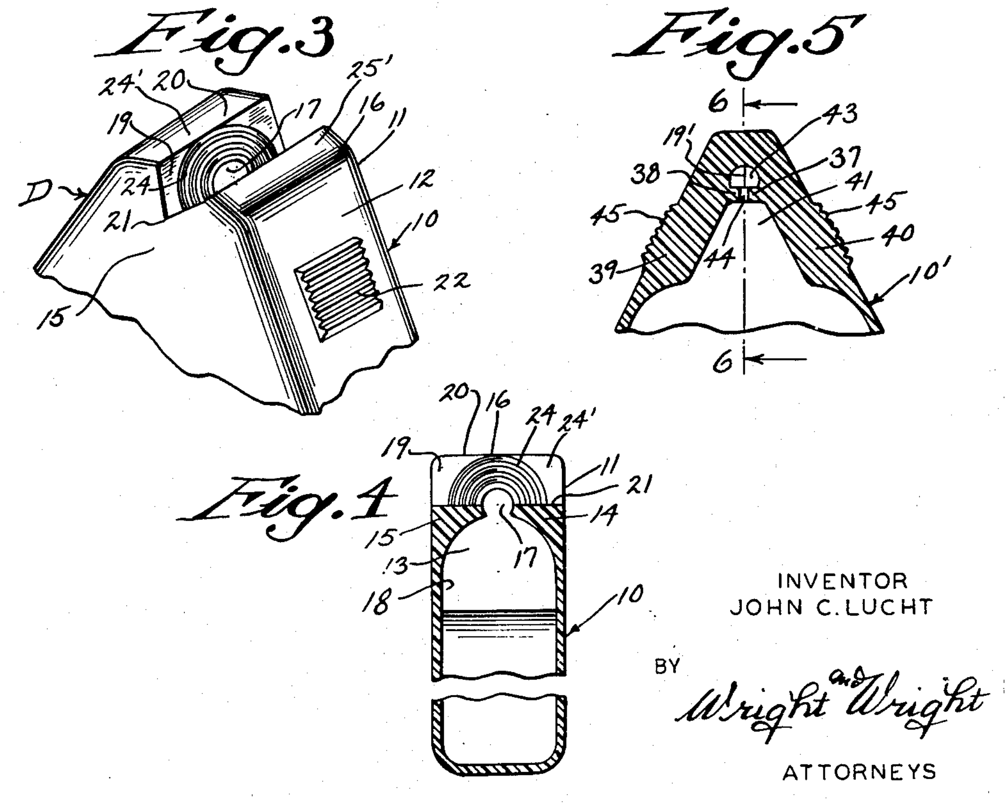
FIGURE 3 is a fragmentary view in perspective of the device as shown in FIGURE 2.
FIGURE 4 is a transverse, vertical sectional view taken from the viewpoint of line 4—4 in FIGURE 2.
FIGURE 5 is a fragmentary, side-elevational view in section corresponding to FIGURE 1 but showing a modification of the embodiment of FIGURE 1.
Figure 6:
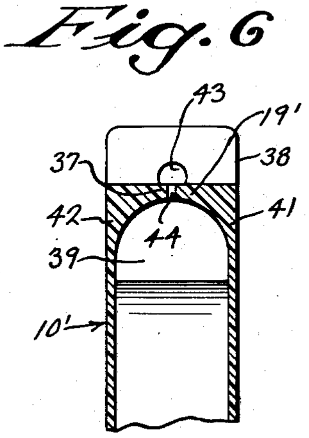
FIGURE 6 is a fragmentary transverse sectional view taken from the viewpoint of line 6—6 in FIGURE 5.

Referring now to FIGURES 5 and 6 of the drawing, it can be seen that I may provide a further modification in which the fulcrum point 37 is reinforced by forming a solid bridge portion 38 integrally molded and joining the walls 39, 40, 41 and 42 of the body 10'. This forms a built-in fulcrum about mid-way of the cavity 43 and access is had through a small aperture 44 to the contents of the dispenser. The slit 19' and structure of the jaws, serrations (if desired), etc. are identical to that form shown in FIGURES 1 to 4 of the drawings. Thumb grips 45 are also furnished.

Figure 7:
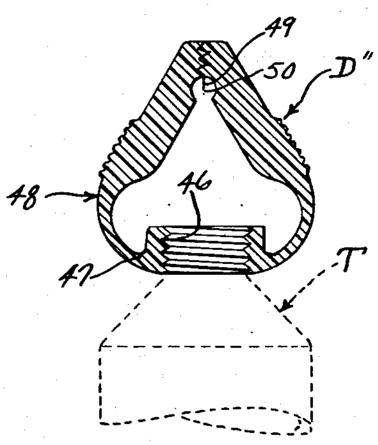
FIGURE 7 is a side-elevational view in section of another embodiment of the dispensing head of my invention.

In FIGURE 7 of the drawings, I have illustrated how my novel invention may be applied to a conventional toothpaste tube T or other type of threaded container in lieu of the conventional cap. In this form of my invention the dispensing head "D" operates both as closure (cap) and as means for dispensing the contents of the tube. The construction thereof is identical to that form shown in FIGURES 1 to 4 of the drawings except that I provide a reinforced threaded aperture 46 in the bottom wall 47 of the reduced body portion 48. This threaded aperture 46 is of a size and configuration to thread over the conventional threads of the tube T. Split jaws 49 and fulcrum 50 operate in the same manner as that form previously described and shown in FIGURES 1 to 4 inclusive.

Figure 8:
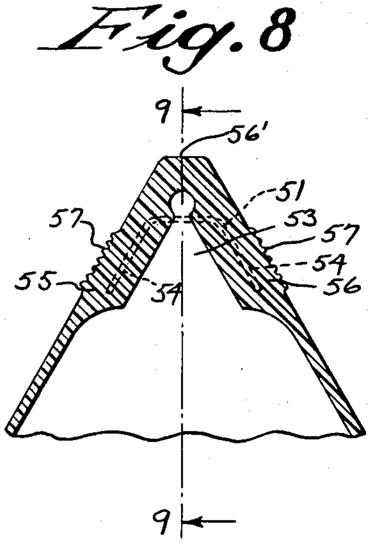
FIGURE 8 is a side-elevational view in section corresponding to the views of FIGURES 1, 5, and 7, showing another embodiment.
Figure 9:
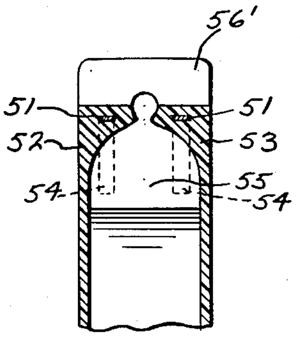
FIGURE 9 is a transverse, cross-sectional view taken from the viewpoint of line 9—9 in FIGURE 8.

Attention is now directed to FIGURES 8 and 9 of the drawings wherein I have illustrated a further modification of my device and again, it is to be noted that the dispenser is identical in principle and operation to that form illustrated in FIGURES 1 to 4 of the drawings. However, it is conceivable that the inherent resiliency of some of the materials used may not be sufficient to tightly close the slit 19 (FIGURES 1 to 4). Therefore I may provide a pair of springs 51 each of the flat leaf spring type, substantially U-shaped, and embedded so that the legs 54 thereof extend downwardly into the end walls 55 and 56 respectively and tend to exert force outwardly towards the thumb and finger grips 57. This pressure causes the slit 56 to be held firmly in a closed position; otherwise, the operation, principle and construction is the same as that illustrated more particularly in FIGURES 1 to 4 of the drawings.

Therefore, inasmuch as the principle of operation and even the structure is substantially the same in all forms of my invention, in order to operate my novel dispenser D, D' and D'', it is merely necessary to exert pressure inwardly on the thumb and finger grips 22 and 23 (FIGURES 1 to 4 inclusive), 30 (FIGURES 10 to 12 inclusive), 57 (FIGURES 8 and 9) and 45 (FIGURES 5 and 6). This inward pressure will tend to spread open the respective jaws to a comparable position illustrated in FIGURES 2, 3, 11 and 12 of the drawings and by squeezing on the body of the respective container the contents will be dispensed through the central conduit 17, 17', 43 or 49 respectively.

Referring specifically to FIGURES 10 and 12 of the drawings and to state my unique closure concept in still another way, it can be said that I provide broadly an essentially outer convex wall conformation of resilient material which is hollow inside, and said material is partially seperated into two convex portions by a slit 26. This slit extends through said outer convex wall conformation and ends in two terminal points 35, which points are placed opposite each other and posterior to the outermost extension of the hollowed area 17'. The walls of the convex portion separated by the slit 26 are reinforced so that inward pressure may be exerted at points 30 posterior to the points 35 to cause pivoting at the fulcrum points which of course are also the terminal points 35 of the slit 26.

By virtue of the fact that the hollowed area 17' within the essentially outer convex wall conformation does extend outward or forward of the slit end fulcrum points 35, the pivoting at the slit end fulcrum points results in opening the mated edges of the slit, thereby exposing a passageway or conduit past the fulcrum points, which passageway is partially formed by said hollowed area 17'.

My closure may be made as previously mentioned of any resilient material and it is a signal advantage of my design that it is so arranged that the natural resiliency of the material used may be augmented by molding springs within the sides of the closure, which spring will exert pressure to keep the jaws of the closure tightly closed.

While all of the forms shown thus far indicate a slit placed exactly in the center of the essentially outer convex wall conformation, it is evident from the nature of my novelty that this need not be the case. The slit may be placed off-center to create jaws of unequal size and shape and I may even provide extended integrally molded lever-type handles (not shown) to assist in applying pressure. When pressure is applied, it is possible to apply in one motion force which will urge the jaws to pivot about the points 35 and compress the body of the container (if the container is a resilient or compressible container) to force outward the contents; thus a motion of just one hand may open the closure and expel the contents from the interior.

When pressure is released from the thumb and finger grips the inherent resiliency of the material will cause the respective dispensing opening or slit to resume its normal closed position.

The relatively rigid wall portions accommodating thumb and finger grips in the embodiments shown, may be lengthened to extend farther down the sides of the container than in such embodiments as those of FIGURES 1 and 2, 52–54, 55 and 57 and away from the slit, thus accommodating gripping action by the fingers or by the hand holding the container at points increasingly distant from the slit. Such lengthening (as in the embodiments of FIGURES 10–12 and 58–62) of the portions which act to open the slit, makes it more convenient to collapse the body of a flexible container in a single squeezing motion which also pivots the upper side wall portions of the relatively rigid wall portions to open position. Thus, both the opening and the forcible evacuation of a container may be achieved by a single squeezing motion of the single hand holding the container.

Referring now to FIGURES 13 and 13*a*, there is shown an embodiment indicated generally as 60 of the dispensing head of the invention which may be utilized as shown or which preferably may be operated upon in a manner described below to provide a preferred embodiment of the invention. First sidewall portions 61 and 61' are relatively rigid by reason of being made relatively thick and comprise upper portions 67 and 67' and lower portions 69 and 69'. Disposed between sidewall portions 61 and 61' are relatively thin and resilient sidewall portions 62 (of which interior surface 64 is shown in FIGURE 13) and 62'. Slit 65 is provided in one end of the head extending downwardly into sidewall portions 62 and 62' and located between portions 67 and 67'. Interior surfaces 63 and 63' of portions 69 and 69' and 64 and 64' (64' not shown in the figures) of portions 62 and 62' combine to define in part a conduit which extends communicatingly from slit 65 to a container (not shown) to which the head may be attached by means of depending flange member 208. Pressure such as finger pressure of an operator may be applied to portions 69 and 69' to thereby move portions 61 and 61' hingeably or rotatably with respect to fulcrum 68 (which is coincident with the lower termini of slit 65) and hingeably move portions 67 and 67' apart and thereby open slit 65 by producing deformation of thin resilient walls 62 and 62' so that the contents of the container may be dispensed through the conduit and thence through slit 65. Upon release of such pressure, the resilience of the material comprising the dispensing head and particularly the walls 62 and 62' causes portions 61 and 61' to hingeably move about fulcrum 68 in a reverse manner to thereby close slit 65, thus halting the dispensing of contents and closing the container to the atmosphere.

By suitable operations upon the head 60 of FIGURES 13 and 13*a* described below in connection with FIGURES 14 and 15, there may be provided a preferred embodiment which is shown in FIGURES 16 to 21. These operations result in providing a head having portions and parts which are the same as those of head 60, though some are changed. Referring now to FIGURES 16 to 21, such portions and parts are therefore numbered identically to those in FIGURES 13 and 13*a*. But many of the parts in the embodiment of FIGURES 13 and 13*a* are deformed as shown particularly at 201, and 201' in sidewall portions 61 and 61' and at 202 and 202' in sidewall portions 62 and 62'. By reason of such deformation, stresses are introduced into sidewall portions 61, 61', 62 and 62' which tend to deform the head into a position wherein upper portions 67 and 67' would be partly coextensive in space. Because they cannot be co-extensive in space said stresses provide pressure of each of the walls 66 and 66' of slit 65 against each other. Said pressure is a compressive force and produces a compressive stress in each of said walls. The magnitude of such compressive stress upon and in various portions of wall 66 is discussed below in connection. Such compressive stress may be greater in a portion of wall 66 which is more remote from fulcrum 68 than in a portion of wall 66 which is nearer to fulcrum 68. The magnitude of the stress in a portion of the wall may be proportional to the remoteness of such portion from fulcrum 68, as discussed hereinbelow in connection with FIGURES 49, 50 and 51.

The stresses in the walls may be overcome by finger pressure as shown in FIGURES 20 and 21 whereby pressure between walls 66 and 66' and compressive stress therein is first reduced to nil and then portions 61 and 61' are caused to rotate hingeably about fulcrum 68, which coincides with lower termini of slit 65, to open slit 65 in the same manner discussed in connection with FIGURES 13 and 13*a*.

Release of such finger pressure results first in closure of slit 65 and then in re-imposition of the compressive stress represented by arrows 203, 233 and 243 in FIGURES 49, 50 and 51 due to the resilience of the wall portions and the stresses which have been introduced thereinto.

The embodiment of FIGURES 16 to 21 may be provided with a flange such as flange 208 to facilitate its connection to a container or may be made integral with a container in a manner hereinbefore and hereinafter described in connection with the same or similar embodiments.

Referring now to FIGURE 14, the head 60 of FIGURE 13 is placed within mold 401 and mold cover 402 is placed adjacent mold 401 and clamped thereagainst by means not shown. Mold 401 may consist of metal parts 491 and 492 having a layer of insulating material 493. The cavity thus provided by mold members 401 and 402 conforms to the exterior shape of head 60 with the exception that spaces 405 and 406 are provided adjacent the outer surfaces of portions 69 and 69'. Fluid under pressure, such as hydraulic oil, water, air, or the like then may be introduced into the interior of head 60 through aperture 403 in mold cover 402 as indicated by arrow 404. Either mold part 492, or a portion of the fluid which is applied under pressure as indicated by arrow 404 or both mold part 492 and a portion of the fluid may be heated so that the portion of the head 60 which is adjacent mold part 492 is heated and members 69 and 69' are caused to deform to at least partially fill spaces 405 and 406. The upper portion of the head and especially portions 67 and 67' are preferably kept cool so that the yield strength of the material is exceeded only in the lower part of the head. This may be accomplished by cooling part 491 or by refraining from heating part 491; it then remains unheated because of being insulated from part 492 by member 493. If hot fluid is supplied, it should not contact the portion of the head adjacent part 491. Any suitable heating means may be utilized to heat part 492 or a desired portion of the fluid. Thus, radiant or conduction heating or dielectric or induction heating may be utilized. The mold part 492 or the fluid or both may then be cooled, that is, the mold parts may be cooled or cool fluid may be supplied in place of the hot fluid or both and then fluid pressure may be released. The head retains the form it assumed when spaces 405 and 406 were filled or partially filled and mold cover 402 may then be removed and the head removed from mold 401 whereupon a head is produced having the form shown in FIGURES 16 to 21 and having stresses therein which produce the pressure indicated by arrows 203, 233 and 243. In order to produce the preferred stresses, it is preferred that permanent deformation be introduced into only a portion of the head.

A suitable material from which the head may be made is ordinary or straight polyethylene; i.e., a polymer of ethylene having a density of .91 to .92 having numerous side chains and cross branchings and having melting and softening points in a range of from about 190° F. to 225° F. In producing a head from such material, the mold parts or fluid or both are heated to a temperature of from about 205 ° F. to about 230° F. or higher, it only being necessary that the softening point of the plastic be reached. With a lower temperature, such as 200° F. or 205° F. and a fluid pressure of 60 pounds per square inch, several minutes may be required to produce the desired deformation, whereas with higher temperatures or higher pressures or both, shorter times are required so that for example with a temperature of about 210° F. and a pressure of 100 p.s.i., less than a minute may be required and with higher temperatures, of, say, 230° F. or 240° F. and even a pressure as low as 50 or 60 p.s.i. even a shorter time is required. The specific temperatures and pressures required form no part of the instant invention, since both the temperature and pressure are determined by the nature of the material used and any one of several materials may be used.

Thus, a suitable material may be a so-called linear polyethylene, that is, a polymer of ethylene made by any one of certain recently developed processes whereby a polymer is produced which may have a density of from about .95 to .98 and wherein the molecules are relatively free from side chains and cross branching. Such polyethylenes have higher melting points and higher softening points than straight or ordinary polyethylenes. Heads in accordance with the invention may also suitably be made from resilient materials comprising nylon, polypropylene, polycarbonates or other suitable resilient and even elastomeric polymeric materials.

Referring now to FIGURE 15, there is shown schematically a step in another method which may be used to produce the head of FIGURES 16 to 21. A device indicated generally as 408 which has two portions, 409 and 410, which fit surfaces 63 and 63' of head 60 is inserted within head 60. Spring 411 in device 408 biases portions 409 and 410 outwardly opposite from each other. A suitable portion of head 60 with device 408 inserted therein may be heated by any suitable means. Thus the head may be placed partially within an oven or may be placed within an oven having portions thereof maintained at different temperatures or may be immersed in a hot liquid such as water 494, as shown, to thereby heat a suitable portion of the material of which head 60 is made. As a result of the softening of the resilient plastic from which the head may be made the biasing action of spring 411 causes portions 409 and 410 to move outwardly from each other, thereby deforming portions 69 and 69' to provide head 60' as shown in FIGURE 15. The head may be immersed to a greater or lesser extent than that shown; the extent of immersion, duration of immersing and temperature of the liquid are determined by the particular material used and the design of the particular head being made and may be as used in conventional molding procedure or may be determined with ease for a particular design. A guide to selection of proper values for time and temperature is given above. In place of a liquid heating bath to heat a portion of the head there may be used one or more streams, sprays or jets of hot fluid, either fluid such as water or oil, vapor such as steam or gas such as air. I may also use dielectric heating to heat a suitable portion of the head. The amount of deformation provided in head 60' may be sufficient to provide a head as shown in FIGURES 16 to 21 but suitably heating is continued until the deformation of portions 69 and 69' is greater than that shown in FIGURE 15; then the head is cooled and then device 408 is removed, whereupon a head in accordance with FIGURES 16 to 21 is produced.

Other means than those shown and discussed herein in detail may be used to introduce stresses in accordance with the invention. Thus, a portion of the head or all or a portion of the container body or a combination of a portion of the head and all or a portion of the body, after being made by molding, casting or the like may be heated and allowed to shrink or heated and mechanically deformed inward (as shown for example in FIGURES 52 to 54) to introduce such stresses. Furthermore, the introduction of stresses may take place as a second step in injection molding or blow molding the head, utilizing all or part of the original mold in which the head was made.

A head in accordance with FIGURES 13 and 13*a*, having a flange 208 which is circular in plan view as shown in FIGURE 13*a*, may be attached by said flange to the elliptical neck 415 of bottle 416 shown in FIGURE 22; the embodiment of FIGURES 23 and 24 is thus provided.

As shown in FIGURES 23 and 24, flange 208 is caused to be elliptical in plan and in consequence portions 69 and 69' are forced outwardly at the bottom thereof as at 211 and 211' and wall portions 62 and 62' are forced inwardly as at 212 and 212'. Thereby stresses are introduced in the wall portions 61 and 61', 62 and 62', which produce compressive stresses on the walls of slit 65 corresponding to those discussed in connection with the embodiment of FIGURES 16 to 21 and illustrated in FIGURES 49, 50 and 51.

Referring now to FIGURE 26, a head may be made which is generally elliptical in plan and which, like the head of FIGURES 13 and 13*a*, is relatively unstressed. Thus flange 208 and wall portions 71, 71', 72 and 72' corresponds to wall portions 61, 61', 62 and 62' and coact in the same manner, so that slit 75 may be opened and closed by applying pressure to members 71 and 71' in the same way that slit 65 is opened by application of pressure to the lower portions of members 61 and 61' and allowed to close in the manner hereinbefore described.

The head of FIGURE 26 may be applied to and attached to a bottle 418 having a circular neck 419 (as shown in FIGURE 25) to provide the embodiment of FIGURE 27. The embodiment of FIGURE 27 when viewed in cross section on line **24*a*—24*a* is similar in appearance to the embodiment of FIGURE 24 and stresses are provided in wall portions 71, 71', 72 and 72' which act like the stresses in members 61, 61', 62 and 62'** in the embodiment of FIGURE 24 and which cause pressure to be exerted between the walls of the slit in the manner discussed in connection with FIGURES 49 to 51.

The compressive stress provided on the walls of the slit in the embodiments of FIGURES 24 and 27, respectively, generally corresponds to such pressure discussed in connection with FIGURES 49 to 51.

Stresses within the walls of the head of the invention may be provided (as in the embodiment of FIGURES 8 and 9 or the embodiment of FIGURE 32) by embedding a spring or springs in the walls or (as in the the embodiments of FIGURES 34 and 44) by placing a spring member in the interior of the head in co-acting engagement with the walls or (as in the embodiment of FIGURES 35 to 38) by attaching spring members to the outside of the head. In each of these embodiments spring member or members co-act with the walls to provide two relatively rigid opposite wall portions, with the exception of the embodiment of FIGURE 44. Consequently in these embodiments, except that of FIGURE 44, all of the wall portions may be of the same thickness or approximately the same thickness because the relative rigidity of opposite wall portions is provided by the spring member or members. Because the spring members provide such relative rigidity of opposite wall portions it is not necessary that two opposite wall portions be made relatively thick, as in the embodiments hereinbefore described, in order to provide such relative rigidity.

Referring more particularly to FIGURES 29, 31 and 32, spring member 420 as shown in FIGURE 29 may be placed within a cavity in mold 421 and held in place within the cavity in spaced apart relation to the interior walls thereof by pins 422 which may engage the ends of member 420. Suitable mold members (not shown for simplicity) may then be brought into engagement with mold member 421 and the head indicated generally as 80 may be produced by injection molding, casting or the like. When head 80 is removed from mold member 421, head 80' as shown in FIGURE 32 is provided wherein member 420 acts to provide maximum outward distortion of members 89 and 89' at regions 221 and 221'. In operation, portions 89, 89', 87, 87', 83, 83', 84, 88, 88', 86, 86', and 85 correspond respectively to members 69, 69', 67, 67', 63, 63', 64, 68, 68', 66, 66', and 65 and slit 85 thus is closed and opened in the same manner as slit 65.

As shown in FIGURE 33, a head indicated generally as 90 may be made by casting or molding or the like. It may corresponding to head 80 with the exception that instead of being provided with means for imbedding the springs within the walls, recesses 424 and 425 are provided in the interior surfaces of lower sidewall portions 99 and 99' to receive spring 420 which may be inserted by holding its ends together with a suitable device, such as tongs 426, to facilitate its insertion.

In FIGURE 34 there is shown a head 90 into which spring 420 has been inserted, indicated generally as head 90'. Spring 420 biases portions 99 and 99' outwardly, the maximum deformation therein being provided as at points 231 and 232 so that upper portions 97 and 97' of opposite sidewall portions 91 and 91' are forced together so that they tend to be co-extensive in space and thus provide pressure on walls 96 and 96' to provide positive closure of slit 95, the stresses on walls 96 and 96' being similar to the stresses indicated by arrows 203, 233, and 243. Wall 92, as indicated by its interior surface 94, may have a thickness the same or about the same as wall portions 91 and 91', if desired, because the desired relative rigidity of wall portions 91 and 91' may be provided by spring member 420.

Spring members 428 and 429 shown respectively in FIGURE 28 and FIGURE 30 may be utilized in place of spring member 420. The specific form of the spring member is not critical if it is suitably made to co-act with the wall portions of the head to provide stresses therein which provide compressive stress on the walls of the slits, such as slit 95 or slit 85, in the manner hereinbefore described. Spring member 429 may be provided with holes 430 therein to reduce its weight.

Heads 80′ and 90′ may respectively be provided with flanges 228 and 238 to facilitate their connection to containers or if desired may be made integral with a container.

Referring to FIGURES 35 to 40, the head 100 shown in FIGURE 35 may be molded or cast from a suitable material and may be provided with extending notch portions 432 near the bottom of upper sidewall portions 107 and 107′ and with tubular portions 431 attached to lower sidewall portions 109 and 109′. Head 100′ as shown in FIGURES 36, 37 and 38 are provided by inserting springs 430 (FIGURES 39 and 40) into tubes 431 as shown and engaging the tops of each of spring members 430 under notches 432. Maximum deformation in lower sidewall portions 109 and 109′ of opposite wall portions 101 and 101′ is then provided at 241 and 241′. Wall portions 101 and 101′ are made relatively rigid by members 430. Stresses are provided within the wall portions which correspond to the stresses hereinbefore described and the stresses provide pressure on the walls of slit 105 as in other embodiments. Interior surfaces 103, 103′, 104, and 104′ of relatively rigid wall portions 109 and 109′ and relatively flexible wall portions 102 and 102′ respectively in part define a conduit extending communicatingly between slit 105 and a container to which the head may be fitted by means of flange 248.

The head of FIGURE 41 indicated generally as 110 corresponds to head 60 shown in FIGURE 13 with the exception that surfaces 63 and 63′ are provided with ridges 441 and 442 which define a groove 443 therebetween to receive the spring member 440 of FIGURE 42.

In FIGURE 44 there is shown head 110 with spring member 440 inserted therein to provide the head indicated generally as 110′ in which, due to the action of spring 440, the walls are deformed as in the embodiment of FIGURES 16 to 21. The head of FIGURE 44 is operable in the same manner as discussed in connection with the embodiments of FIGURES 16 to 21, 24, 27, 32, 34, and 36 to 38.

Spring member 445, shown in FIGURE 43 may be utilized in place of spring member 440 if the walls of the head are made suitably different in shape in order to suitably receive spring member 445.

As shown in FIGURES 45 and 46 a head 130 may be provided which corresponds generally to the head shown in FIGURES 13 and 13*a*; stresses have not been introduced to provide pressure between the walls of slit 135 and compressive stresses in the walls of slit 135. Thus, parts or members 131, 131′, 132, 132′, 133, 133′, 134, 134′, 135, 137, 137′, 138, 139 and 139′ and 258 correspond respectively to parts or members 61, 61′, 62, 62′, 63, 63′, 64, 64′, 65, 67, 67′, 68, 69, 69′, and 208. Head 130 differs primarily from head 60 in that wall portions 131 and 131′ may be somewhat thinner or thicker than walls 132 and 132′ or may be of the same or approximately the same thickness; the relative rigidity of wall portions 131 and 131′ with respect to wall portions 132 and 132′ is provided by causing walls 131 and 131′ to be of more rigid material, that is, different and more rigid chemical composition as indicated at 234 and 234′. Walls 131 and 131′ may be made separately from walls 132 and 132′ and be made of more rigid material and the head may be assembled into the form shown in FIGURES 45 and 46 by cementing or bonding various parts together, including the wall portions. Alternatively, the head may be made (with the configuration shown in FIGURES 45 and 46) of a material which may be subjected to chemical treatment to harden it and then wall portions 131 and 131′ may be subjected to such treatment to make them relatively harder and more rigid than wall portions 132 and 132′. For example, the head might be molded of a co-polymer of polyvinyl chloride and polyvinylidene chloride and wall portions 131 and 131′ might then be subjected to one of the treatments described in the literature for hardening such material such as for example a liquid or gas comprising one of a number of amines or other nitrogen-containing compounds. Alternatively, similar hardening may be effected by using a physical treatment to cause a change in chemical composition. Thus, the head 130 may be molded in the configuration shown, utilizing straight or ordinary polyethylene as above mentioned. Hardening of wall portions 131 and 131′ may then be accomplished by subjecting these wall portions 131 and 131′ to the action of gamma rays to thereby change the configuration of the molecules in the polyethylene and cause the polyethylene to become harder and more rigid in the treated area.

In FIGURES 47 and 48 there is shown another embodiment wherein relatively greater rigidity is provided in wall portions 141 and 141′ than in wall portions 142 and 142′ by adhering metal or other stiff plates 450 and 450′ to wall portions 141 and 141′ with adhesive 451 and 451′. Pressure may then be applied on the lower portions of 141 and 141′ to hingeably move portions 141 and 141′ with respect to fulcrum 148 and to thereby hingeably move upper sidewall portions 147 and 147′ apart with respect to each other and open slit 145. Head 240 corresponds to head 60 in that stress has not been introduced therein to create pressure between walls 146 and 146′ of slit 145. Such stresses may suitably be introduced by applying to head 240 any one of the processes hereinbefore described for the introduction of such stresses to deform first relatively rigid sidewall portions 141 and 141′ and relatively flexible and resilient wall portions 142 and 142′ to introduce pressure between slit walls 146 and 146′ and thereby introduce compressive stress into said walls.

As shown schematically in FIGURES 49, 50 and 51, pressure between the walls of the slit is provided by introduction of stresses into the head as hereinbefore discussed, that is, each slit wall exerts pressure on the other wall and as a result there is a compressive stress in the material adjacent each wall which is represented by arrows 203, 233 and 243 respectively in the three figures. In FIGURE 49 there is shown a portion of an embodiment having slit wall 266, fulcrum 268 and upper portion 267 of a relatively rigid sidewall. In FIGURE 50 there is shown a portion of a similar embodiment having slit wall 286, fulcrum 288 and upper portion 287 of a relatively rigid wall. In FIGURE 51 there is shown a portion of an embodiment having slit wall 246, fulcrum 248 and upper portion 247 of a relatively rigid sidewall. Stresses may be introduced into the heads of these figures in any of the manners hereinbefore described; for example the process described in connection with FIGURE 14 or the process described in connection with FIGURE 15 may be used to provide any one of these heads, wherein the wall portions have been deformed to introduce stresses therein and, as a result, pressure is applied by each of the slit walls to the opposite slit wall so that adjacent portions of said upper sidewall portions would be partly co-extensive in space if that were possible. Since it is not, said pressure results in compressive stresses, as hereinbefore mentioned, which have magnitude indicated by the arrows. It may be seen that the compressive stress is preferably greater in the slit walls in each of FIGURES 49, 50 and 51 at points more remote from the fulcrum. In FIGURE 49 the rate of increase of the compressive stress with respect to the distance of a point in wall 266 from fulcrum 268 may be reduced in proportion to the distance of the point from the fulcrum as indicated by dotted line 501 which indicates the locus of the ends of arrows 203. In FIGURE 50, as shown by arrows 233, and line 502 which indicates the locus of the arrow ends, the rate may be increased.

In FIGURE 51, the rate is shown as being constant, as shown by arrows 243 and line 503 which traces the rate of increase as indicated by the magnitudes of the arrows.

The embodiments of each of FIGURES 49, 50 and 51 are similar, if not identical to the upper portions of the embodiments of FIGURES 8 and 9, FIGURES 16 to 21, FIGURE 24, FIGURE 27, FIGURE 32, FIGURE 34, FIGURES 36 to 38, FIGURE 44, FIGURES 53 and 54, FIGURE 55, FIGURE 56, FIGURE 57, FIGURES 58 to 62 and embodiments which may be made by introducing stresses into the head of FIGURES 45 and 46 and the head of FIGURES 47 and 48. The rate of increase in any one of these embodiments may be as shown in FIGURE 49, FIGURE 50 or FIGURE 51 or may be somewhat different from that shown in any one of these three figures; it may be somewhat irregular for example. Thus a curve (such as lines 501, 502 or 503) depicting the rate of increase might be zig-zag or snake-like in form, it being preferred only that there be an increase, not necessarily a regulaar rate of increase. The depiction of the rate as increasing or decreasing or constant respectively in FIGURES 49, 50 and 51 is wholly and entirely schematic and the invention is equally applicable whether the rate increases or decreases or is constant. The rate is in most embodiments either constant or nearly constant but is determined by details of the design of the wall portions which are chosen for reasons which constitute no part of the invention such as mold design, appearance, economics, and the like, and the rates indicated schematically in FIGURES 49, 50 and 51 do not necessarily correspond to the actual rates obtained with the embodiments described in this specification.

Referring now to FIGURE 52, there is shown a head **60*a* having sidewall portions and other features identical to those of head 60** in FIGURES 13 and 13*a*. The head **60*a* of FIGURE 52 is made integral with container 460**; the head and container may be made of the same material.

Stresses may be introduced into the head **60*a* of 460 by heating and then deforming (or deforming and then heating) container 460 and then cooling container 460 while maintaining the deformation of the combination of head and container to provide the embodiment of FIGURES 53 and 54 which contains stresses in the sidewall portions of the head which provide pressure between the walls of 66 and 66′ of slit 65 in the same manner as hereinbefore described in connection with other embodiments. It may be noted that resulting container 460′ is relatively distorted and may serve as a fancy or decorative container and portions of the resulting head 60*a*′** are deformed in much the same manner as the corresponding portions of the head are deformed in the embodiment as shown in FIGURES 23 and 24.

The dispensing head and container shown in initial unstressed form in FIGURE 52 has a generally concentric or regular shape. The device is distorted into a less concentric and more irregular shape in final stressed form (as shown in FIGURES 53 and 54) in order to introduce compressive stresses as described above. But, if for aesthetic purposes a more concentric and more regular shape is desired as the final stressed form of a container embodying my invention, it is obvious that the initial unstressed container may have a relatively less concentric and more irregular shape so that when its shape has been changed to introduce compressive stresses as hereinbefore described, its shape will be relatively more concentric and more regular.

Notice too that, although the embodiment shown in FIGURES 52 to 54 has a clearly defined head (**60*a* and 60*a*′) formed integrally with the major container or body portion (460 and 460′) such structural differentiation according to function is not essential to the invention. Rather, as discussed in connection with FIGURES 10 to 12, convenient operation by means of a single squeezing motion of the single hand holding the container may be fostered by extending downwardly the relatively rigid sidewall portions 61 and 61′ of the head shown in FIGURES 52 to 54 so that they are smoothly integrated into the container body portion and are capable of pivoting open slit 65 by application of squeezing force at points more distant from slit 65, thereby making it possible to compress the container body to forceably expel the container's contents while at the same time opening slit 65**.

In FIGURE 55 there is shown an embodiment wherein stresses have been introduced into a head to provide pressure between the walls of slit 155. Relatively rigid sidewall portions 151 and 151′ are of different lengths; the upper portions 157 and 157′ thereof are of different lengths and lower portions 159 and 159′ thereof are of different lengths. A conduit is defined in part by inner surfaces 153 and 153′ of members 151 and 151′ and in part by inner surfaces 154 and 154′ (154′ not shown) of the relatively flexible sidewall portions between sidewall portions 151 and 151′. The conduit is extended beyond said sidewall portions to a flange 268 in such manner that contents emerging from a container to which flange 268 may be attached travel substantially through a 90° angle within the head before emerging from slit 155. The positions occupied by wall portions 151 and 151′ and the portions thereof when slit 155 is opened are shown in dotted lines.

Referring now to FIGURE 56 an embodiment is provided wherein relatively rigid first sidewall portions 161 and 161′ are markedly dissimilar. Both wall portions 161 and 161′ are relatively more rigid than the wall portions which join them, the inside surface 164 of one of these wall portions being shown. However, wall portion 161′ is relatively much more rigid than wall portion 161 and wall portion 161 is provided with a handle or gripping member 461 which serves mainly to give the device a somewhat different aesthetic appearance. When pressure is applied to the lower relatively rigid wall portions 69 and 69′, wall portion 161 rotates hingeably with respect to slit 65 to open slit 65 by hingeably moving portions 167 and 167′ apart from each other around fulcrum 168. The position of the parts when slit 165 is opened is shown by dotted lines. When the slit is opened, it may be observed that a plane passing through the slit so that equal amounts of the slit are provided on each side of the plane is represented by dashed line 462. It may be observed that each of wall portions 161 and 161′ is rotatably displaced with respect to such plane (about fulcrum 168) when the slit is in the open position from the positions they have with respect to slit 165 when it is closed. As shown, the embodiment of FIGURE 56 is shown as deformed to introduce stresses in the sidewalls to provide pressure between the walls of the slit 165; such stresses may be introduced in order to provide such pressure in any one of the manners hereinbefore described.

Referring now to FIGURE 57, there is shown a head indicated generally as 170, made integral with a container 465. Head 170 may correspond to any one of the embodiments of FIGURES 1 to 54. It may be noted that a plane (indicated by dashed line 470) passing through slit 175 and defined by slit 175 is at a considerable angle to bottom 466 of container 465. A head such as head 170 may alternatively be made integral with or fitted to a container having any one of a number of relationships to a plane 470 passing through slit 175, as indicated respectively by dotted lines 467, 468 and 469.

Referring now to FIGURES 58 to 62, there is shown another embodiment wherein a head indicated generally as 180 is made integral with a container 480. Head 180 comprises relatively rigid sidewall portions 181 and 181′ and relatively flexible, resilient sidewall portions 182 and 182′. Slit 185 at one end of the head communicates with the interior of container 480 through a conduit defined in part by interior surfaces 183 and 183′ of members 181 and 181′ and interior surfaces 184 and 184′ of sidewall portions 182 and 182′ (inner surface 184 and sidewall portion 182′ not being indicated in the figures). Sidewall portions 181 and 181′ are relatively rigid with respect to portions 182 and 182′ by reason of being somewhat thicker than portions 182 and 182′ and by reason of portions 182 and 182′ being corrugated in the form of collapsible bellows, the corrugations of such bellows being integral with similar corrugations in bellows portions which form parts of container 480 as hereinafter described. Container 480 comprises relatively rigid sidewall portion 481 extended from head sidewall portion 181 and relatively rigid sidewall portions 482, 483 and 484 extended from head sidewall portion 181′. Portions 482, 483 and 484 have the form of a channel, portion 482 constituting the bottom of the channel and portions 483 and 484 the sides of the channel. Container sides 486 and 487 and bottom 485 extend between aforementioned side members 481 and 483 and 484 and have the form of corrugated collapsible bellows as shown.

When force is applied to members 481 and 482 to move them toward each other, the corrugated bellows of bottom 485, container sides 486 and 487, and head sidewall portions 182 and 182′ are somewhat collapsed and force is transmitted to lower head sidewall portions 189 and 189′ to cause these portions to move together as upper sidewall portions 187 and 187′ are moved apart; sidewall portions 181 and 181′ move hingeably or rotatably with respect to fulcrum 188 which is coincident with the lower termini of slit 185 and thereby slit walls 186 and 186′ are moved apart to open slit 185. Removal of pressure on members 481 and 482 results in a reverse hingeable movement of the several portions of the device about fulcrum 188 to close slit 185 due to the resilience in the material of which the corrugated bellows of members 182, 182′, 485, 486 and 487 is made. During the manufacture of the device, suitable stresses may preferably be introduced into these latter members to cause pressure to be exerted between slit walls 186 and 186′ when slit 185 is closed by reason of said stresses exerting pressure outwardly respectively on members 481 and 482 and 189 and 189′. Thus the portions of the head adjacent are urged toward a position wherein said portions would be coextensive in space.

The container need not be entirely emptied at each use, but a small or large amount, as desired, may be delivered from the container in accordance with the duration and magnitude of pressure applied to members 481 and 482. In any event, a single application of pressure serves both to open slit 185 and to dispense or express the contents of container 480 through slit 185. The depth of the channel formed by members 482, 483 and 484 may be such as to cause sidewall 482 to be adjacent to sidewall 481 when the corrugated bellows of members 485, 486 and 487 is entirely collapsed. Such construction provides for dispensing a maximum amount of the contents of container 480 by expressing such contents as would be contained between the collapsed bellows, as shown in the figures.

The introduction of stresses into the head, as described heretofore may also be accomplished by suitably deforming a block of resilient material and then machining a head from the block while the deformation is maintained. After the machining has been completed or nearly completed, the block may be released so that the deformation is no longer maintained, to thereby provide a head containing such stresses.

The methods of introducing stresses described in connection with FIGURES 14 and 15 may suitably be varied. For example, the deformation may be accomplished while the head is cold and then made permanent by changing the chemical composition of the head as described in connection with FIGURE 45 or by any other suitable method such as making the unstressed head of a material which may be further polymerized or cross-linked (vulcanized or cured) to make it more rigid, then deforming it, then cross-linking it or further polymerizing it while maintaining such deformation to make such deformation permanent and thereby provide for permanence of the stresses introduced by the deformation.

It should be noted that spring member 420 mentioned in connection with FIGURE 31 and 32 has its ends forced together to stress it prior to its introduction into mold member 421 and when held therein by members 422, stresses remain therein so that it tends to assume the shape shown in FIGURE 32 when it is released.

The various embodiments of the dispensing head of my invention may be utilized with containers to dispense pills, powders, granules, and the like, as well as liquids or pastes as hereinbefore mentioned.

When material is dispensed from a container through a slit in a head in accordance with my invention, a drop or drop-like portion of the material may cling to the edge of one or both of the walls of the slit. As the slit closes at the time finger pressure is released the internal volume of the head increases and all or a part of such clinging material is drawn back into the head by suction. The effectiveness of this feature is greater when the head is utilized with a resilient container (whether the head is integral with the container or is attached thereto by a threaded connection, flange connection or other connection) than with a rigid container if the container is squeezed to dispense the contents because the change in total interior volume is greater and the volume of air drawn back through the slit when pressure is released is greater and consequently greater suction and a greater flow of air are provided to carry such clinging material back into the interior of the head.

The head in accordance with the invention may have any suitable dimension. Thus, the width of the slit may be as small as a fraction of a millimeter or as large as 2 inches or even 6 inches.

It may thus be seen that the invention is broad in scope and includes such modifications as will be apparent to those skilled in the art and is to be limited only by the claims.

Having thus described my invention, I claim:

1. A substantially resilient dispensing head for a container comprising a member of resilient material having two first sidewall portions and two second sidewall portions, a conduit at least partly defined on opposite sides by interior surfaces of the lower portions of said first sidewall portions and at least partly defined between said opposite sides by interior surfaces of said second sidewall portions, a slit in one end of said member communicating with said conduit, said slit having walls provided by upper portions of said first sidewall portions, said first sidewall portions hingeable about a fulcrum to move said upper portions apart and to bring toward each other said lower portions thereof with concomitant flexing of said second sidewall portions, said conduit disposed to provide for communication between said slit and a container at the opposite end of said head from said slit, said head particularly characterized by said first sidewall portions being relatively rigid and said second sidewall portions being relatively flexible and resiliently deformable and by said fulcrum coinciding substantially with the lower termini of said slit and by stresses in said sidewall portions which tend to deform said head into a position wherein said upper portions would be partly coextensive in space, said stresses providing pressure of each of said walls of said slit againt the other to provide closing of said slit, said slit having lower termini which are substantially on a single line, said head particularly characterized by said fulcrum coinciding substantially with said line and therefore with the lower termini of said slit.

2. A substantially resilient dispensing head for a container comprising a member of resilient material having two first sidewall portions and two second sidewall portions, a conduit at least partly defined on opposite sides by interior surfaces of the lower portions of said first sidewall portions and at least partly defined between said opposite sides by interior surfaces of said second sidewall portions, a slit in one end of said member communicating with said conduit, said slit having walls provided by upper portions of said first sidewall portions, said first sidewall portions hingeable about a fulcrum to move said upper portions apart and to bring toward each other said lower portions thereof with concomitant flexing of said second sidewall portions, said conduit disposed to provide for communication between said slit and a container at the opposite end of said head from said slit, said head particularly characterized by said fulcrum coinciding substantially with the lower termini of said slit and by stresses in said sidewall portions which tend to deform said head into a position wherein said upper portions would be partly coextensive in space, said stresses providing pressure of each of said walls of said slit against the other to provide positive closing of said slit, said slit having lower termini which are substantially on a single line, said head particularly characterized by said fulcrum coinciding substantially with said line and therefore with the lower termini of said slit.

3. A substantially resilient dispensing head for a container comprising a member of resilient material having two first sidewall portions and two second sidewall portions, a conduit at least partly defined on opposite sides by interior portions of the lower surfaces of said first sidewall portions and at least partly defined between said opposite sides by interior surfaces of said second sidewall portions, a slit in one end of said member communicating with said conduit, said slit having walls provided by upper portions of said first sidewall portions, said first sidewall portions hingeable about a fulcrum to move said upper portions apart and to bring toward each other said lower portions thereof with concomitant flexing of said second sidewall portions, said conduit disposed to provide for communication between said slit and a container at the opposite end of said head from said slit, said head particularly characterized by said first sidewall portions being relatively rigid and said second sidewall portions being relatively flexible and resiliently deformable and by said fulcrum coinciding substantially with the lower termini of said slit, said slit having lower termini which are substantially on a single line, said head particularly characterized by said fulcrum coinciding substantially with said line and therefore with the lower termini of said slit.

4. The device of claim 1 wherein said first sidewall portions are thicker than said second sidewall portions to provide the greater rigidity of said first sidewall portions.

5. The device of claim 1 wherein at least portions of said first sidewall portions are of different chemical composition and more rigid chemical composition than said second sidewall portions.

6. The device of claim 1 wherein said first sidewall portions have at least one spring member acting thereon to provide said relative rigidity of said portions and to provide said stresses to provide said positive closing of said slit.

7. The device of claim 1 wherein said first sidewall portions have at least one relatively rigid member adhered to a resilient portion of each of said first sidewall portions to provide said relative rigidity of said first sidewall portions.

8. The device of claim 1, wherein said pressure which is provided by said stresses which tend to deform said head, provides compressive stress in said walls of said slit and wherein the magnitude of such compressive stress in any portion of said walls is proportional to the remoteness of such portion of said wall from said fulcrum.

9. A substantially resilient dispensing head for a container comprising a member of resilient material having two first sidewall portions and two second sidewall portions, a conduit at least partly defined on opposite sides by interior surfaces of the lower portions of said first sidewall portions and at least partly defined between said opposite sides by interior surfaces of said second sidewall portions, a slit in one end of said member communicating with said conduit, said slit having walls provided by upper portions of said first sidewall portions, said first sidewall portions moveable to move said upper portions apart and open said slit, said conduit disposed to provide for communication between said slit and a container at the opposite end of said head from said slit, said head particularly characterized by stresses in said sidewall portions which tend to deform said head into a position wherein said upper portions would be partly coextensive in space, said stresses providing pressure of each of said walls of said slit against the other to provide closing of said slit, said slit having lower termini which are substantially on a single line, said head particularly characterized by said fulcrum coinciding substantially with said line and therefore with the lower termini of said slit.

10. The device of claim 1 wherein said first sidewall portions have at least one spring member embedded therein to provide said stresses to provide said positive closing of said slit.

11. The device of claim 1 wherein said first sidewall portions have at least one spring member acting therein to provide said stresses to provide said positive closing of said slit.

12. A dispensing head for a container comprising: an elongated member of resilient material having two first sidewall portions and two second sidewall portions, said first sidewall portions being more rigid than said second sidewall portions and a passage in said member, said passage defined on opposite sides by interior surfaces of the lower portions of said first sidewall portions and defined between said opposite sides by interior surfaces of said second sidewall portions, a slit in the end of said elongated member communicating with said passage, said slit having lower termini which are substantially on a single line, said slit defined by upper portions of said first sidewall portions, said first sidewall portions hingeable about a fulcrum to separate hingeably said upper portions thereof and bring toward each other said lower portions thereof with concomitant flexing of said second sidewall portions, said second sidewall portions resiliently and positively biasing said first sidewall portions toward closing said slit by pressing together said upper portions thereof, said elongated member disposed to provide for communication between said passage and a container at the opposite end of said passage from said slit, said head particularly characterized by said fulcrum coinciding substantially with the lower termini of said slit.

13. A dispensing head as set forth in claim 12 wherein said first sidewall portions are biased toward closing said slit at least in part by one spring embedded in said elongated member.

14. A dispensing head for a container comprising: a member of resilient material having two first sidewall portions and two second sidewall portions, said first sidewall portions being more rigid than said second sidewall portions, and a passage in said member, said passage defined on opposite sides by interior surfaces of the lower portions of said first sidewall portions and defined between said opposite sides by interior surfaces of said second sidewall portions, a slit in the end of said member communicating with said passage, said slit having termini which are substantially on a single line, said slit having walls provided by upper portions of said first sidewall portions, said first sidewall portions hingeable about a fulcrum to move said upper portions apart and to bring toward each other said lower portions thereof with concomitant flexing of said second sidewall portions, said member disposed to provide for communication between said passage and a container at the opposite end of said passage from said slit, said head particularly characterized by said fulcrum coinciding substantially with the lower termini of said slit.

15. The dispensing head of claim 14 further characterized by said sidewall portions being disposed to provide biasing closing pressure to force the walls of said slit together.

References Cited by the Examiner

UNITED STATES PATENTS

| | | | |
|---|---|---|---|
| 2,219,604 | 10/40 | Trotter | 222—207 |
| 2,597,410 | 5/52 | Tronson | 222—490 |
| 2,611,515 | 9/52 | Smith | 222—213 |
| 2,720,881 | 10/55 | Jones | 128—261 |
| 2,730,274 | 1/56 | Brown | 222—490 |
| 2,733,843 | 2/56 | Seroko | 222—490 |
| 2,904,225 | 9/59 | Earles | 222—183 |

LOUIS J. DEMBO, *Primary Examiner.*